(12) United States Patent
Zeng

(10) Patent No.: US 10,412,670 B2
(45) Date of Patent: Sep. 10, 2019

(54) INFORMATION TRANSMISSION METHOD, WIRELESS ACCESS DEVICE, AND TERMINAL DEVICE

(71) Applicant: Huawei Technologies Co., Ltd., Shenzhen (CN)

(72) Inventor: Kun Zeng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/610,448

(22) Filed: May 31, 2017

(65) Prior Publication Data

US 2017/0273020 A1    Sep. 21, 2017

Related U.S. Application Data

(63) Continuation of application No. PCT/CN2014/092690, filed on Dec. 1, 2014.

(51) Int. Cl.
*H04W 52/02* (2009.01)
*H04W 76/28* (2018.01)
(Continued)

(52) U.S. Cl.
CPC ..... *H04W 52/0209* (2013.01); *H04W 72/042* (2013.01); *H04W 72/0446* (2013.01); *H04W 76/28* (2018.02); *H04W 16/14* (2013.01); *H04W 88/02* (2013.01); *H04W 88/08* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/25* (2018.01)

(58) Field of Classification Search
None
See application file for complete search history.

(56) References Cited

U.S. PATENT DOCUMENTS

2005/0143123 A1  6/2005  Black et al.
2008/0107095 A1  5/2008  Black et al.
(Continued)

FOREIGN PATENT DOCUMENTS

CN    101043696 A    9/2007
CN    101268707 A    9/2008
(Continued)

OTHER PUBLICATIONS

IEEE Standards Association, "Part 11: Wireless LAN Medium Access Control (MAC) and Physical Layer (PHY) Specifications; Amendment 3: Enhancements for Very High Throughput in the 60 Ghz Band," IEEE Computer Society, IEEE Std.11ad™-2012, Dec. 28, 2012, 628 pages.

*Primary Examiner* — Bob A Phunkulh
(74) *Attorney, Agent, or Firm* — Slater Matsil, LLP

(57) ABSTRACT

The present invention provides an information transmission method, a wireless access device, and a terminal device. The method includes: sending an instruction message to a terminal device on a first band, where the instruction message is used to instruct the terminal device to detect information on a second band; obtaining permission to use a spectrum resource on the second band; and sending the information to the terminal device on the second band.

16 Claims, 10 Drawing Sheets

(51) Int. Cl.
*H04W 72/04* (2009.01)
*H04W 88/02* (2009.01)
*H04W 88/08* (2009.01)
*H04W 16/14* (2009.01)

(56) References Cited

U.S. PATENT DOCUMENTS

| | | | |
|---|---|---|---|
| 2010/0029216 A1* | 2/2010 | Jovicic | H04B 7/2615 |
| | | | 455/68 |
| 2011/0044239 A1 | 2/2011 | Cai et al. | |
| 2011/0287794 A1* | 11/2011 | Koskela | H04W 28/08 |
| | | | 455/509 |
| 2013/0077554 A1 | 3/2013 | Gauvreau et al. | |
| 2013/0315152 A1* | 11/2013 | Ratasuk | H04W 76/14 |
| | | | 370/329 |
| 2013/0337821 A1* | 12/2013 | Clegg | H04L 5/0062 |
| | | | 455/452.1 |
| 2014/0148191 A1* | 5/2014 | Feng | H04W 72/1215 |
| | | | 455/454 |
| 2014/0269464 A1 | 9/2014 | Park et al. | |
| 2015/0181438 A1 | 6/2015 | Li et al. | |
| 2015/0264702 A1* | 9/2015 | Yang | H04W 72/0453 |
| | | | 455/452.1 |
| 2016/0337949 A1* | 11/2016 | Parkvall | H04L 5/001 |
| 2017/0265082 A1* | 9/2017 | Jiang | H04W 16/14 |

FOREIGN PATENT DOCUMENTS

| | | |
|---|---|---|
| CN | 103907388 A | 7/2014 |
| WO | 2013189251 A1 | 12/2013 |

\* cited by examiner

300

Receive, on a first band, an instruction message sent by a wireless access device, where the instruction message is used to instruct terminal device to detect information on a second band — S310

Detect the information on the second band according to the instruction message — S320

INFORMATION TRANSMISSION METHOD, WIRELESS ACCESS DEVICE, AND TERMINAL DEVICE

CROSS-REFERENCE TO RELATED APPLICATIONS

This application is a continuation of International Application No. PCT/CN2014/092690, filed on Dec. 1, 2014, the disclosure of which is hereby incorporated by reference in its entirety.

TECHNICAL FIELD

The present invention relates to the communications field, and more specifically, to an information transmission method, a wireless access device, and a terminal device.

BACKGROUND

A radio spectrum resource is a scarce strategic resource, and a regulatory body in each country has strict specifications on use of the radio spectrum resource. Currently, a common practice is dividing a radio spectrum into licensed bands and unlicensed bands by means of fixed allocation and designation. Most radio spectra are licensed bands and exclusively used by particular systems, for example, broadcast television bands and business mobile communication bands. Some spectra, for public service and welfare purposes such as industry, scientific research, and medical purposes, are open to the public for free as unlicensed resources, for example, wireless intercom, Wireless Fidelity ("Wi-Fi"), and Bluetooth.

As the wireless communications industry is expanding sharply, a contradiction between spectrum demand and spectrum supply is increasingly prominent, and licensed bands alone cannot meet demands for future mobile broadband ("MBB") development and experience. To obtain more spectrum resources, the wireless communications industry organization (the 3rd Generation Partner Project ("3GPP") turns eyes on unlicensed bands, expecting to use the unlicensed bands as a beneficial supplementation to the licensed bands.

However, unlicensed bands to be focused in deployment by the industry, such as a low-frequency band 5 GHz and a high-frequency band 60 GHz, already exist or are to be deployed for other unlicensed systems. Wi-Fi is a typical representative therein. On the 5 GHz frequency band, an 802.11a/n/ac system is deployed. On the 60 GHz frequency band, an 802.11ad system is deployed. Therefore, a 3GPP system needs to contend with these systems for use of spectrum resources on the unlicensed bands. This fact leads to a result that the 3GPP system needs to share the resources with another system on the unlicensed bands, thereby causing the 3GPP system to be in a state of opportunity-based and discontinuous transmission on the unlicensed bands, and a start location of each resource segment to be unfixed. This results from random contention.

A 3GPP system uses base-station-centered centralized network control (network-centric), so when the 3GPP system performs opportunity-based contention with another system for resources, a base station represents an entire network to contend with a device in the another system for permission to use the resources. After obtaining the resources by means of contention, the base station needs to notify a terminal device of a result of the contention. When the base station is in a state of opportunity-based and discontinuous information transmission on a band, to ensure that the terminal device can successfully receive information sent by the base station on the band, a method used in a current technology is to keep the terminal device in an information receiving state on the band all the time, however, bringing unnecessary power consumption overheads.

Therefore, when a wireless access device is in a state of opportunity-based and discontinuous information transmission on a band, how to reduce power consumption overheads of a terminal device is an urgent problem to be resolved currently.

SUMMARY

The present invention provides an information transmission method, a wireless access device, and a terminal device, so as to reduce power consumption overheads of the terminal device.

According to a first aspect, an information transmission method is provided. The method includes sending an instruction message to a terminal device on a first band, where the instruction message is used to instruct the terminal device to detect information on a second band. The method also includes obtaining permission to use a spectrum resource on the second band; and sending the information to the terminal device on the second band.

With reference to the first aspect, in a first possible implementation of the first aspect, the second band is an unlicensed band and/or a licensed shared band.

With reference to the first aspect or the first possible implementation of the first aspect, in a second possible implementation of the first aspect, the instruction message includes band sequence number information, and the band sequence number information is used to indicate a band sequence number corresponding to each band in the second band.

With reference to any one of the first aspect, the first possible implementation of the first aspect, or the second possible implementation of the first aspect, in a third possible implementation of the first aspect, before the sending an instruction message to a terminal device on a first band, the method further includes determining time information used to instruct the terminal device to detect the information transmitted on the second band, where the instruction message further includes the time information.

With reference to the third possible implementation of the first aspect, in a fourth possible implementation of the first aspect, the determining time information used to instruct the terminal device to detect the information transmitted on the second band includes: determining a candidate timeslot corresponding to a time segment in which the information is sent on the second band; and determining the time information according to the candidate timeslot.

With reference to the third or the fourth possible implementation of the first aspect, in a fifth possible implementation of the first aspect, the time information includes first duration, and the first duration is duration in which the terminal device detects the information transmitted on the second band.

With reference to the fifth possible implementation of the first aspect, in a sixth possible implementation of the first aspect, the time information further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of the candidate timeslot.

With reference to the sixth possible implementation of the first aspect, in a seventh possible implementation of the first aspect, a sum of the second duration and the first duration is greater than or equal to the second time interval; or a sum of the second duration and the first duration is greater than or equal to the second time interval and less than or equal to a sum of the second time interval and duration that is corresponding to the candidate timeslot.

According to a second aspect, an information transmission method is provided. The method includes receiving, on a first band, an instruction message sent by a wireless access device, where the instruction message is used to instruct a terminal device to detect information on a second band. The method also includes detecting the information transmitted on the second band according to the instruction message.

With reference to the second aspect, in a first possible implementation of the second aspect, the second band is an unlicensed band and/or a licensed shared band.

With reference to the second aspect or the first possible implementation of the second aspect, in a second possible implementation of the second aspect, the instruction message includes band sequence number information; and the detecting the information transmitted on the second band according to the instruction message includes: obtaining the band sequence number information included in the instruction message; determining, according to the band sequence number information, the second band used by the wireless access device to send the information; and detecting the information transmitted on the second band according to the instruction message.

With reference to any one of the second aspect, the first possible implementation of the second aspect, or the second possible implementation of the second aspect, in a third possible implementation of the second aspect, the instruction message further includes time information used to instruct the terminal device to detect the information transmitted on the second band.

With reference to the third possible implementation of the second aspect, in a fourth possible implementation of the second aspect, the time information includes first duration, and the first duration is duration in which the terminal device detects the information transmitted on the second band; and the detecting the information transmitted on the second band according to the instruction message includes: when the information transmitted on the second band is detected within the first duration that is after detection of the information transmitted on the second band is started, using a moment at which the information is detected as a start moment at which the wireless access device sends the information transmitted on the second band.

With reference to the fourth possible implementation of the second aspect, in a fifth possible implementation of the second aspect, the time information further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of a candidate timeslot corresponding to a time segment in which the wireless access device sends the information transmitted on the second band; and the detecting the information transmitted on the second band according to the instruction message includes: starting detecting the information transmitted on the second band after the instruction message is received and after the second duration expires; and when the information transmitted on the second band is detected within the first duration, using the moment at which the information is detected as the start moment at which the wireless access device sends the information transmitted on the second band.

With reference to the fifth possible implementation of the second aspect, in a sixth possible implementation of the second aspect, a sum of the second duration and the first duration is greater than or equal to the second time interval; or a sum of the second duration and the first duration is greater than or equal to the second time interval and less than or equal to a sum of the second time interval and duration that is corresponding to the candidate timeslot; and the detecting the information transmitted on the second band according to the instruction message includes: when the information transmitted on the second band is detected within the first duration that is after detection of the information transmitted on the second band is started, using the moment at which the information is detected as the start moment at which the wireless access device sends the information transmitted on the second band; or when the information transmitted on the second band is not detected within the first duration that is after detection of the information transmitted on the second band is started, entering a dormant state on the second band.

According to a third aspect, a wireless access device is provided. The device includes a first sending module, configured to send an instruction message to a terminal device on a first band, where the instruction message is used to instruct the terminal device to detect information on a second band. The device also includes an obtaining module, configured to obtain permission to use a spectrum resource on the second band. The device also includes a second sending module, configured to send the information to the terminal device on the second band.

With reference to the third aspect, in a first possible implementation of the third aspect, the second band is an unlicensed band and/or a licensed shared band.

With reference to the third aspect or the first possible implementation of the third aspect, in a second possible implementation of the third aspect, the instruction message sent by the first sending module includes band sequence number information, and the band sequence number information is used to indicate a band sequence number corresponding to each band in the second band.

With reference to any one of the third aspect, the first possible implementation of the third aspect, or the second possible implementation of the third aspect, in a third possible implementation of the third aspect, the wireless access device further includes a determining module, configured to determine time information used to instruct the terminal device to detect the information transmitted on the second band, where the instruction message sent by the first sending module further includes the time information determined by the determining module.

With reference to the third possible implementation of the third aspect, in a fourth possible implementation of the third aspect, the determining module is specifically configured to determine a candidate timeslot corresponding to a time segment in which the information is sent on the second band; and determine the time information according to the candidate timeslot.

With reference to the third or the fourth possible implementation of the third aspect, in a fifth possible implementation of the third aspect, the time information determined by the determining module includes first duration, and the first duration is duration in which the terminal device detects the information transmitted on the second band.

With reference to the fifth possible implementation of the third aspect, in a sixth possible implementation of the third aspect, the time information determined by the determining module further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of the candidate timeslot.

With reference to the sixth possible implementation of the third aspect, in a seventh possible implementation of the third aspect, a sum of the second duration and the first duration is greater than or equal to the second time interval; or a sum of the second duration and the first duration is greater than or equal to the second time interval and less than or equal to a sum of the second time interval and duration that is corresponding the candidate timeslot.

According to a fourth aspect, a terminal device is provided. The device includes a receiving module, configured to receive, on a first band, an instruction message sent by a wireless access device, where the instruction message is used to instruct the terminal device to detect information on a second band. The device also includes a detection module, configured to detect the information transmitted on the second band according to the instruction message received by the receiving module.

With reference to the fourth aspect, in a first possible implementation of the fourth aspect, the second band is an unlicensed band and/or a licensed shared band.

With reference to the fourth aspect or the first possible implementation of the fourth aspect, in a second possible implementation of the fourth aspect, the instruction message received by the receiving module includes band sequence number information, and the terminal device further includes: an obtaining module, configured to obtain the band sequence number information included in the instruction message received by the receiving module; and a determining module, configured to determine, according to the band sequence number information obtained by the obtaining module, the second band used by the wireless access device to send the information; and the detection module is specifically configured to detect, according to the instruction message, the information transmitted on the second band determined by the determining module.

With reference to any one of the fourth aspect, the first possible implementation of the fourth aspect, or the second possible implementation of the fourth aspect, in a third possible implementation of the fourth aspect, the instruction message received by the receiving module further includes time information used to instruct the terminal device to detect the information transmitted on the second band.

With reference to the third possible implementation of the fourth aspect, in a fourth possible implementation of the fourth aspect, the time information includes first duration, and the first duration is duration in which the detection module detects the information transmitted on the second band; and the detection module is specifically configured to: when detecting the information transmitted on the second band within the first duration that is after detection of the information transmitted on the second band is started, use a moment at which the information is detected as a start moment at which the wireless access device sends the information transmitted on the second band.

With reference to the fourth possible implementation of the fourth aspect, in a fifth possible implementation of the fourth aspect, the time information further includes second duration, the second duration is a first time interval between a moment at which the receiving module receives the instruction message and a moment at which the detection module starts to detect the information transmitted on the second band, and the second duration is less than or equal to a second time interval between the moment at which the receiving module receives the instruction message and a start moment of a candidate timeslot corresponding to a time segment in which the wireless access device sends the information transmitted on the second band; and the detection module is specifically configured to: after the receiving module receives the instruction message and after the second duration expires, start to detect the information transmitted on the second band; and when detecting the information transmitted on the second band within the first duration, use the moment at which the information is detected as the start moment at which the wireless access device sends the information transmitted on the second band.

With reference to the fifth possible implementation of the fourth aspect, in a sixth possible implementation of the fourth aspect, a sum of the second duration and the first duration is greater than or equal to the second time interval; or a sum of the second duration and the first duration is greater than or equal to the second time interval and less than or equal to a sum of the second time interval and duration that is corresponding to the candidate timeslot; and the detection module is specifically configured to: when detecting the information transmitted on the second band within the first duration that is after detection of the information transmitted on the second band is started, use the moment at which the information is detected as the start moment at which the wireless access device sends the information transmitted on the second band; or when not detecting the information transmitted on the second band within the first duration that is after detection of the information transmitted on the second band is started, instruct the terminal device to enter a dormant state on the second band.

Based on the foregoing technical solutions, according to the information transmission method, the wireless access device, and the terminal device in the present invention, a wireless access device sends an instruction message to a terminal device, to instruct the terminal device to detect information on a second band, so that the terminal device can determine a start moment at which the wireless access device transmits the information transmitted on the second band. Therefore, power consumption overheads of the terminal device can be reduced.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), or a Worldwide Interoperability for Microwave Access ("WiMAX" for short) communications system.

It should be understood that in the embodiments of the present invention, a wireless access device may be a base station, a cell, a relay, or the like. The base station may be a base station (Base Transceiver Station, "BTS" for short) in the GSM or CDMA, a NodeB ("NB" for short) in the WCDMA, or an evolved NodeB ("ENB" or e-"NodeB" for short) in the LTE, which is not limited in the present invention. For ease of description, the following embodiments provide descriptions by using a base station as an example.

It should also be understood that in the embodiments of the present invention, a terminal device may be referred to as terminal equipment, a mobile station ("MS" for short), a mobile terminal, or the like. The terminal device may communicate with one or more core networks through a radio access network ("RAN" for short). For example, the terminal device may be a mobile phone (also referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

Figure 1A:
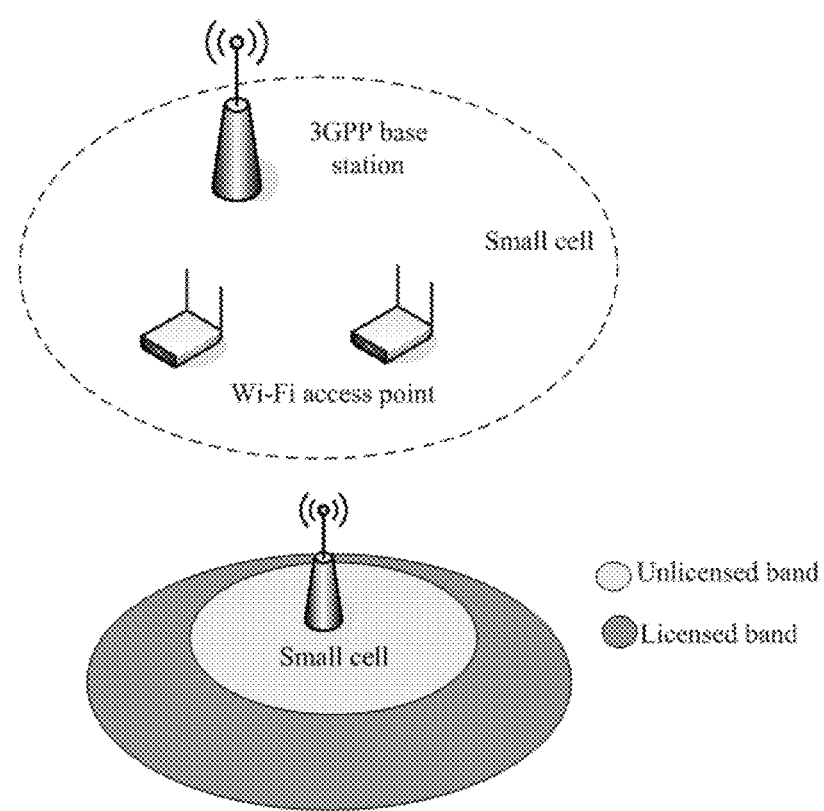
FIG. 1A, FIG. 1B, and FIG. 1C are schematic diagrams of application scenarios according to an embodiment of the present invention.
Figure 1B:
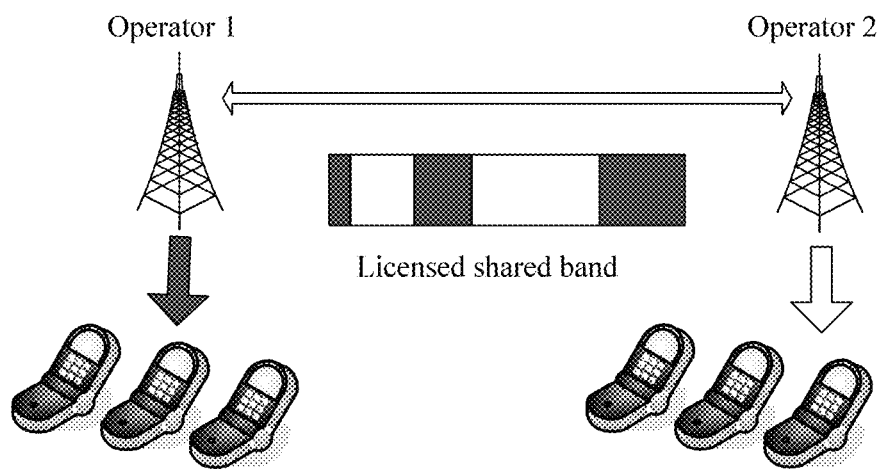
Figure 1C:
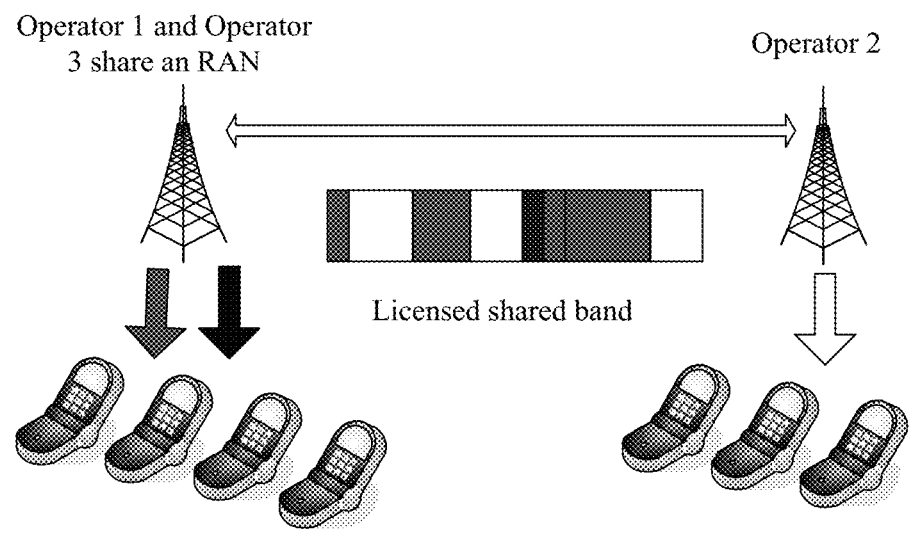

FIG. 1A, FIG. 1B, and FIG. 1C show schematic diagrams of examples of scenarios that may be applied according to an embodiment of the present invention. It should be noted that the examples in FIG. 1A, FIG. 1B, and FIG. 1C are to help a person skilled in the art better understand the embodiments of the present invention but not to limit the scope of the embodiments of the present invention.

As shown in FIG. 1A, in this embodiment of the present invention, a 3GPP small cell uses both a licensed band and an unlicensed band, where there is an intra-band deployment relationship between the unlicensed band of the 3GPP small cell and a Wi-Fi system.

It should be understood that, as shown in FIG. 1B and FIG. 1C, this embodiment of the present invention may be also applied in a case in which multiple operators share a licensed shared band, but this is not limited in the present invention.

It should be understood that, in this embodiment of the present invention, the licensed band is a band that is exclusively used by one particular system or a particular operator, the unlicensed band is a band that is open to the public for free and that different systems are allowed to share, and the licensed shared band is a band that is licensed to multiple operators and that multiple operators are allowed to share.

It should be also understood that, in this embodiment of the present invention, there may be one or more licensed bands, unlicensed bands, or licensed shared bands. This is not limited in the present invention.

Figure 2:
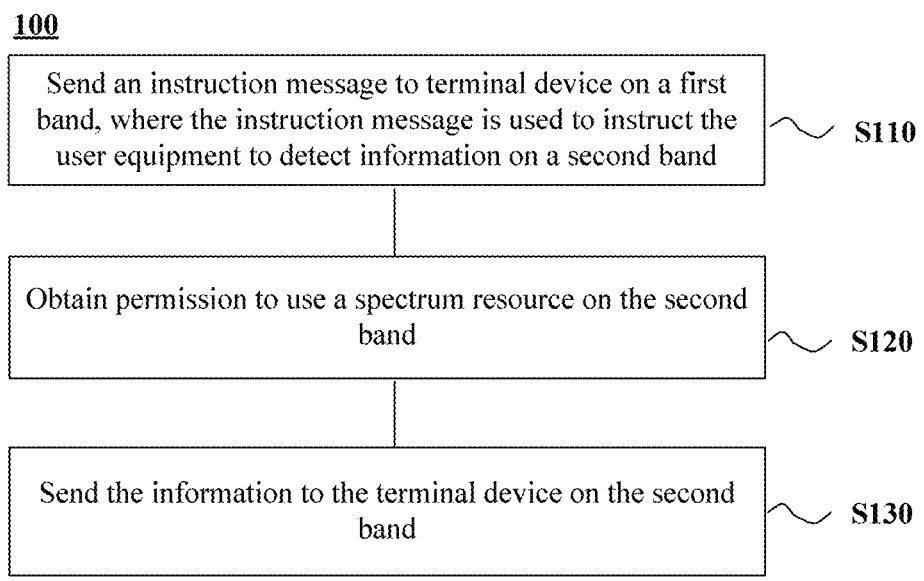
FIG. 2 is a schematic flowchart of an information transmission method according to an embodiment of the present invention.

FIG. 2 is a schematic flowchart of an information transmission method 100 according to an embodiment of the present invention. The method 100 may be performed by a wireless access device (for example, a base station). As shown in FIG. 2, the method 100 includes the following steps.

S110: Send an instruction message to a terminal device on a first band, where the instruction message is used to instruct the terminal device to detect information on a second band.

S120: Obtain permission to use a spectrum resource on the second band.

S130: Send the information to the terminal device on the second band.

Specifically, the wireless access device sends, on the first band and to the terminal device, the instruction message used to instruct the terminal device to detect the information transmitted on the second band. Then, the wireless access device obtains the permission to use the spectrum resource on the second band and sends the information to the terminal device on the second band.

Therefore, according to the information transmission method in this embodiment of the present invention, a wireless access device sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

It should be understood that, in this embodiment of the present invention, the second band may be an unlicensed band and/or a licensed shared band, or a licensed band, and the first band may be a licensed band or an unlicensed band and/or a licensed shared band. This is not limited in the present invention.

Optionally, in S110, there may be one or more first bands occupied by the wireless access device. When there are multiple first bands, the wireless access device may randomly select one first band for sending the instruction message. This is not limited in the present invention.

Optionally, in S110, there may be one or more second bands. When there are multiple second bands, the instruction message sent by the wireless access device includes band sequence number information. The band sequence number information is used to indicate a band sequence number corresponding to each band in the second band, so that the terminal device can receive, on a correct band, the information sent by the wireless access device.

Optionally, in S110, the instruction message sent by the wireless access device may be a cell-level message that is to be notified to all terminal devices in a cell to which the wireless access device belongs, or may be a user-level dedicated message that is to be notified to only a target terminal device.

Figure 3:
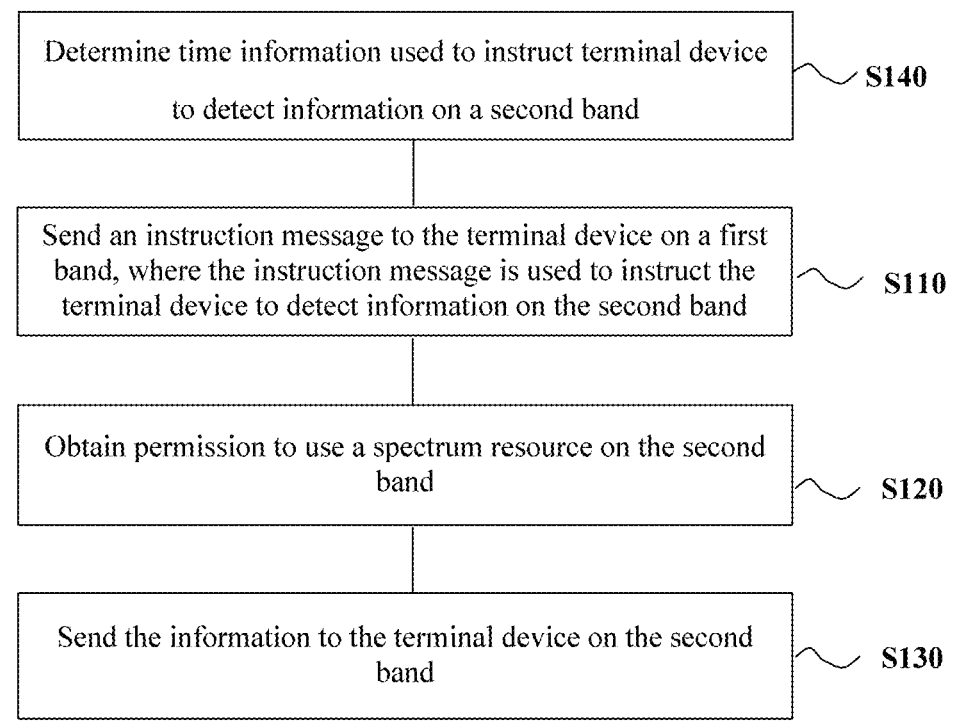
FIG. 3 is another schematic flowchart of an information transmission method according to an embodiment of the present invention.

Optionally, as shown in FIG. 3, the method 100 further includes the following steps.

S140: Determine time information used to instruct the terminal device to detect the information transmitted on the second band.

Correspondingly, in S110, the instruction message further includes the time information.

It should be understood that sequence numbers of the steps in the process are not construed as a constraint or limitation on an execution sequence of the steps. For example, in this embodiment of the present invention, S140 is executed before S110.

In this embodiment of the present invention, optionally, the wireless access device may determine a candidate timeslot corresponding to a time segment in which the information is sent on the second band, and determine the time information according to the candidate timeslot.

Figure 4:
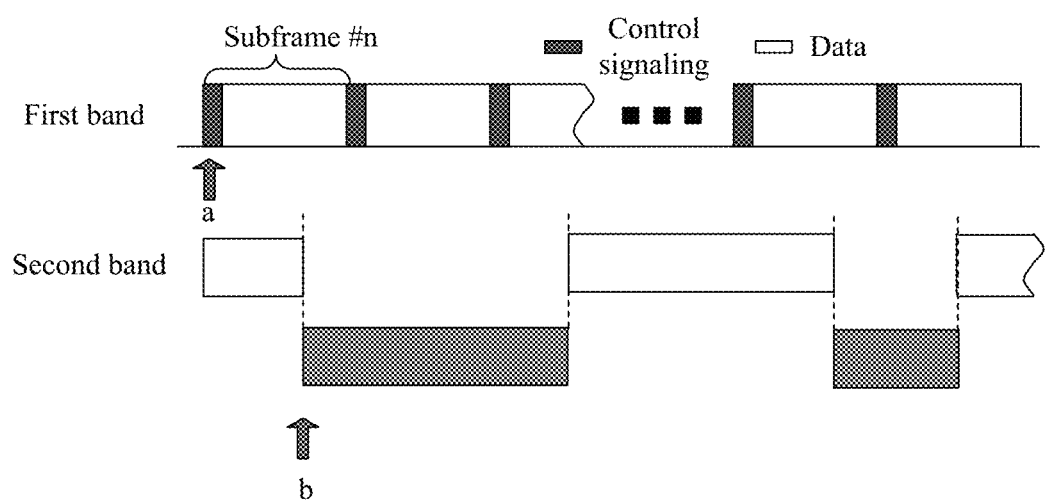
FIG. 4 is a schematic diagram of an information transmission method according to an embodiment of the present invention.

Specifically, in this embodiment of the present invention, as shown in FIG. 4, the wireless access device may predetermine, according to a predetermined contention rule for permission to use a band resource on the second band, a candidate timeslot, on the first band, corresponding to a time segment (b in FIG. 4) in which the wireless access device can transmit the information transmitted on the second band, and determine, according to the candidate timeslot, the time information used to instruct the terminal device to detect the information transmitted on the second band. In S110, in a timeslot (a in FIG. 4) on the first band that is several timeslots ahead of the candidate timeslot, for example, a timeslot that is one timeslot or two timeslots ahead of the candidate timeslot, the radio access device sends, through a control channel of the first band, the instruction message including the time information to the terminal device, to instruct the terminal device to detect the information transmitted on the second band. However, this is not limited in the present invention.

In this embodiment of the present invention, optionally, there may be one or more candidate timeslots determined by the wireless access device. When there are multiple candidate timeslots, the wireless access device determines the time information according to the multiple candidate timeslots. In S110, in a timeslot on the first band that is several timeslots ahead of a candidate timeslot at a front-most time location among the multiple candidate timeslots, for example, a timeslot that is one timeslot or two timeslots ahead of candidate timeslot at a front-most time location among the multiple candidate timeslots, the radio access device sends, through a control channel of the first band, the instruction message including the time information to the terminal device.

Therefore, according to the information transmission method in this embodiment of the present invention, a wireless access device determines a candidate timeslot corresponding to a time segment in which information is transmitted on a second band, determines, according to the candidate timeslot, time information used to instruct a terminal device to detect the information transmitted on the second band, and sends an instruction message including the time information to the terminal device, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

Optionally, in S140, the time information determined by the wireless access device includes first duration, and the first duration is duration in which the terminal device detects the information transmitted on the second band. If the terminal device detects, within the first duration, the information sent by the wireless access device by using the second band, the terminal device uses a moment at which the information is detected as a start moment at which the wireless access device transmits the information transmitted on the second band, and completes receiving of the information. If the terminal device does not receive, within the first duration, the information sent by the wireless access device on the second band, the terminal device stops detecting the information transmitted on the second band and enters a dormant state.

Optionally, in S140, the time information determined by the wireless access device further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of the candidate timeslot. For example, if the moment at which the terminal device receives the instruction message sent by the wireless access device is $t_1$, and the moment at which the terminal device starts to detect the information transmitted on the second band is $t_2$, the second duration is a value of $(t_2-t_1)$, and the moment $t_2$ at which the terminal device starts to detect the information transmitted on the second band needs to be advanced ahead of the start moment of the candidate timeslot determined by the wireless access device.

Optionally, in S140, a sum of the second duration determined by the wireless access device and the first duration is greater than or equal to the second time interval; or a sum of the second duration and the first duration is greater than or equal to the second time interval and less than or equal to a sum of the second time interval and duration that is corresponding to the candidate timeslot.

In this embodiment of the present invention, optionally, the wireless access device may determine the first duration and/or the second duration according to geographical locations of the wireless access device and the terminal device, a path delay during an information transmission process, and a contention algorithm, on the second band, used by the wireless access device to obtain the permission to use the spectrum resource. The second duration determined by the wireless access device needs to ensure that the moment at which the terminal device starts to detect the information transmitted on the second band is ahead of the start moment of the candidate timeslot. However, this is not limited in the present invention.

In this embodiment of the present invention, optionally, the first duration and/or the second duration may be alternatively a value preset by a system. For example, the first duration may be duration corresponding to one timeslot or two timeslots, and the second duration may be zero or duration corresponding to one timeslot or two timeslots. Correspondingly, the wireless access device sends the instruction message to the terminal device on the first band. After receiving the instruction message, the terminal device detects the information transmitted on the second band according to the first duration and/or the second duration that are/is preset by the system. However, this is not limited in the present invention.

The following uses an example in which a base station contends with a terminal device of a Wi-Fi system for permission to use a spectrum resource on an unlicensed band, to describe this embodiment of the present invention. It should be understood that this embodiment of the present invention is not limited to the Wi-Fi system and may further include Bluetooth, wireless intercom, and the like.

Figure 5:
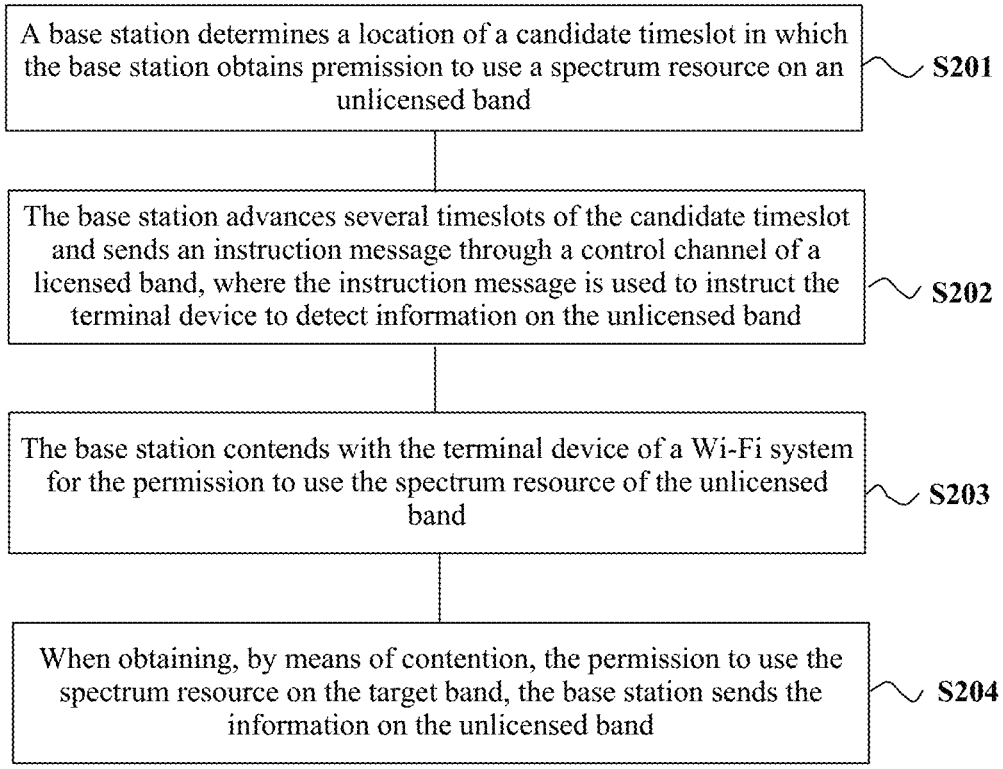
FIG. 5 is a schematic flowchart of an information transmission method in which a base station contends with a terminal device of a Wi-Fi system for permission to use a spectrum resource on an unlicensed band according to an embodiment of the present invention.

FIG. 5 is a schematic diagram of an information transmission method 200 in which a base station contends with a terminal device of a Wi-Fi system for permission to use a spectrum resource on an unlicensed band according to an embodiment of the present invention. The method 200 includes the following steps.

S201: The base station determines a location of a candidate timeslot in which the base station obtains permission to use a spectrum resource on an unlicensed band.

S202: In a timeslot that is several timeslots ahead of the candidate timeslot, the base station sends an instruction message through a control channel of a licensed band, where the instruction message is used to instruct the terminal device to detect information on the unlicensed band.

S203: The base station contends with the terminal device of the Wi-Fi system for the permission to use the spectrum resource on the unlicensed band.

S204: When obtaining, by means of contention, the permission to use the spectrum resource on the unlicensed band, the base station sends the information on the unlicensed band.

Figures 6, 7:
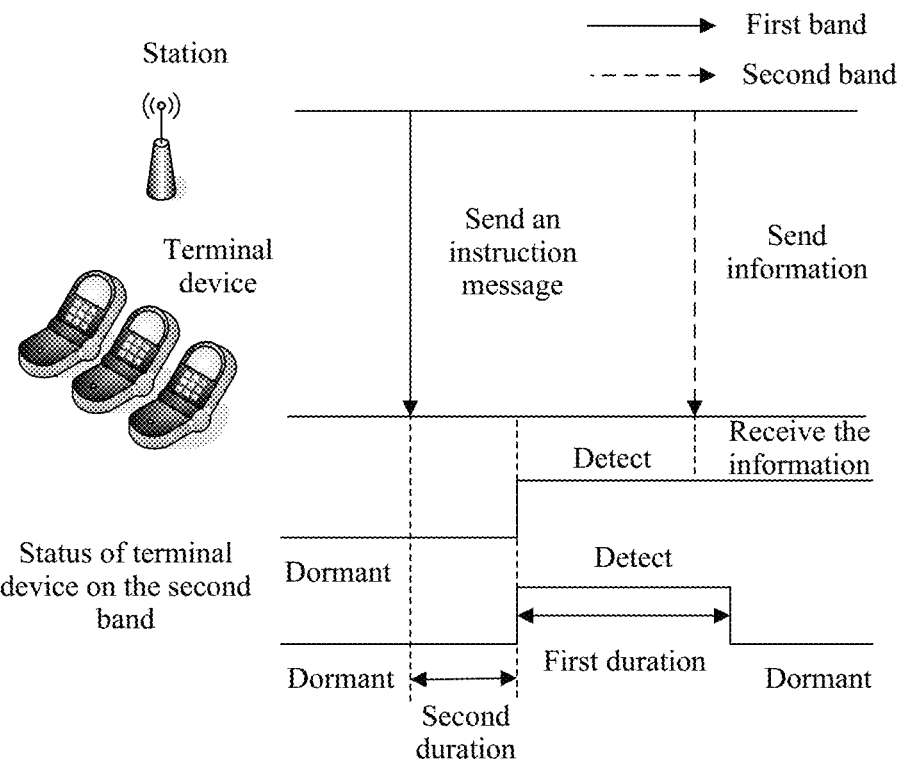
FIG. 6 is a schematic diagram of an information transmission method according to another embodiment of the present invention.
FIG. 7 is a schematic flowchart of an information transmission method according to another embodiment of the present invention.

Optionally, in S202, as shown in FIG. 6, the instruction message instructs the terminal device to keep on detecting the information within first duration that is after the terminal device starts to detect the information on the unlicensed band. If the terminal device detects, within the first duration, the information sent by the base station by using a second band, the terminal device uses a moment at which the information is detected as a start moment at which the base station transmits the information transmitted on the second band this time, and completes receiving of the information. If the terminal device does not receive, within the first duration, the information sent by the base station on the second band, the terminal device stops detecting the information transmitted on the second band and enters a dormant state.

Optionally, in S202, as shown in FIG. 6, the instruction message instructs the terminal device to start to detect the information on the unlicensed band after the terminal device receives the instruction message and after second duration expires. If the terminal device detects, within the first duration, the information sent by the base station by using the second band, the terminal device uses a moment at which the information is detected as a start moment at which the base station transmits the information transmitted on the second band this time, and completes receiving of the information. If the terminal device does not receive, within the first duration, the information sent by the base station on the second band, the terminal device stops detecting the information transmitted on the second band and enters a dormant state.

Optionally, in S202, when there is more than one unlicensed band, the instruction message sent by the base station to the terminal device further includes band sequence number information. The band sequence number information is used to indicate a band sequence number corresponding to each band in the unlicensed band.

Optionally, in S202, the instruction message sent by the base station to the terminal device by using the licensed band may be a cell-level message, or may be a user-level dedicated message.

Optionally, in S204, when obtaining, by means of contention, the permission to use the spectrum resource on the unlicensed band, the base station may first send indication information to the terminal device by using the unlicensed band. The indication information is used to indicate a start moment at which the base station transmits the information on the unlicensed band this time. The terminal device uses a moment at which the indication information is detected as the start moment at which the base station transmits the information on the unlicensed band this time, and completes receiving of other information subsequently sent by the base station. This is not limited in the present invention.

Optionally, in S204, when obtaining, by means of contention, the permission to use the spectrum resource on the unlicensed band, the base station may directly send data information to the terminal device by using the unlicensed band. The terminal device uses a moment at which the data information is detected as a start moment at which the base station transmits the data information on the unlicensed band, and completes receiving of the data information. This is not limited in the present invention.

Therefore, according to the information transmission method in this embodiment of the present invention, a wireless access device sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

With reference to FIG. 2 to FIG. 6, the foregoing describes in detail the information transmission method in the embodiment of the present invention from the perspective of a wireless access device side. With reference to FIG. 7, the following describes in detail an information transmission method according to another embodiment of the present invention from the perspective of a terminal device side. It should be understood that, interaction between the terminal device and the wireless access device and relevant features and functions described from the perspective of the wireless access device side correspond to those described from the perspective of the terminal device side. For brevity, repeated descriptions are properly omitted.

FIG. 7 is a schematic flowchart of an information transmission method 300 according to another embodiment of the present invention. The method 300 may be performed by a terminal device. As shown in FIG. 7, the method 300 includes the following steps.

S310: Receive, on a first band, an instruction message sent by a wireless access device, where the instruction message is used to instruct the terminal device to detect information on a second band.

S320: Detect the information transmitted on the second band according to the instruction message.

Specifically, the terminal device receives, on the first band, the instruction message that is used to instruct the terminal device to detect the information transmitted on the second band and that is sent by the wireless access device. Then, the terminal device detects, on the second band according to the instruction message, the information sent by the wireless access device to the terminal device.

Therefore, according to the information transmission method in this embodiment of the present invention, a terminal device receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

It should be understood that, in this embodiment of the present invention, the second band may be an unlicensed band and/or a licensed shared band, or a licensed band, and the first band may be a licensed band or an unlicensed band and/or a licensed shared band. This is not limited in the present invention.

Optionally, in S310, the terminal device may keep connected to the wireless access device on the first band all the time, or may keep intermittently connected to the wireless access device according to a preset rule, so that the terminal device can receive the instruction message sent by the wireless access device on the first band. This is not limited in the present invention.

Optionally, in S310, the instruction message includes band sequence number information. Correspondingly, in S320, the terminal device obtains the band sequence number information included in the instruction message, determines, according to the band sequence number information, the second band used by the wireless access device to send the information, and detects, on the second band according to the instruction message, the information sent by the wireless access device.

Optionally, in S310, the instruction message includes time information used to instruct the terminal device to detect the information transmitted on the second band.

Optionally, in S310, the time information includes first duration, where the first duration is duration in which the terminal device detects the information transmitted on the second band. If the terminal device detects, within the first duration, the information sent by the wireless access device by using the second band, the terminal device uses a moment at which the information is detected as a start moment at which the wireless access device transmits the information transmitted on the second band this time, and completes receiving of the information. If the terminal device does not receive, within the first duration, the information sent by the wireless access device on the second band, the terminal device stops detecting the information transmitted on the second band and enters a dormant state.

Optionally, in S310, the time information further includes second duration, where the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of a candidate timeslot corresponding to a time segment in which the wireless access device sends the information transmitted on the second band. For example, if the moment at which the terminal device receives the instruction message sent by the wireless access device is $t_1$, and the moment at which the terminal device starts to detect the information transmitted on the second band is $t_2$, the second duration is a value of $(t_2-t_1)$, and the moment $t_2$ at which the terminal device starts to detect the information transmitted on the second band needs to be advanced ahead of the start moment of the candidate timeslot determined by the wireless access device.

Correspondingly, in S320, the terminal device starts to detect the information transmitted on the second band after receiving the instruction message and after the second duration expires.

When detecting the information transmitted on the second band within the first duration, the terminal device uses the moment at which the information is detected as the start moment at which the wireless access device sends the information transmitted on the second band.

Optionally, in S310, a sum of the second duration and the first duration is greater than or equal to the second time interval; or a sum of the second duration and the first duration is greater than or equal to the second time interval and less than or equal to a sum of the second time interval and duration that is corresponding to the candidate timeslot.

Correspondingly, in S320, when detecting the information transmitted on the second band within the first duration that is after detection of the information transmitted on the second band is started, the terminal device uses the moment at which the information is detected as the start moment at which the wireless access device transmits the information transmitted on the second band.

When not detecting the information transmitted on the second band within the first duration that is after detection of the information transmitted on the second band is started, the terminal device enters a dormant state on the second band.

Therefore, according to the information transmission method in this embodiment of the present invention, a terminal device receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

Figure 8:
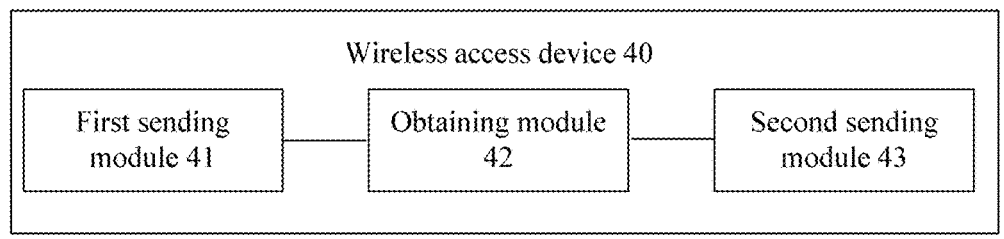
FIG. 8 is a schematic block diagram of a wireless access device according to an embodiment of the present invention.
Figure 9:
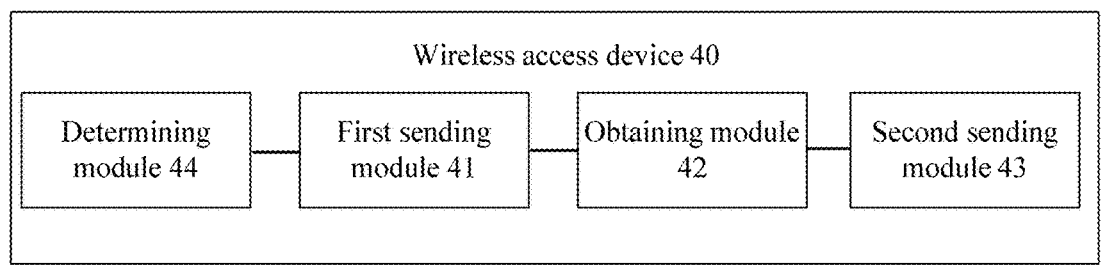
FIG. 9 is another schematic block diagram of a wireless access device according to an embodiment of the present invention.

With reference to FIG. 2 to FIG. 7, the foregoing describes in detail the information transmission method according to the embodiment of the present invention. With reference to FIG. 8 and FIG. 9, the following describes a wireless access device for information transmission according to an embodiment of the present invention.

FIG. 8 is a schematic block diagram of a wireless access device according to an embodiment of the present invention. As shown in FIG. 8, the wireless access device 40 includes a first sending module 41, configured to send an instruction message to a terminal device on a first band, where the instruction message is used to instruct the terminal device to detect information on a second band. The wireless access device 40 also includes an obtaining module 42, configured to obtain permission to use a spectrum resource on the second band. The wireless access device 40 also includes a second sending module 43, configured to send the information to the terminal device on the second band.

Specifically, the first sending module 41 of the wireless access device sends, on the first band and to the terminal device, the instruction message used to instruct the terminal device to detect the information transmitted on the second band. Then, the obtaining module 42 of the wireless access device obtains the permission to use the spectrum resource on the second band, and the second sending module 43 of the wireless access device sends the information to the terminal device on the second band.

Therefore, the wireless access device in this embodiment of the present invention sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

In this embodiment of the present invention, optionally, the second band may be an unlicensed band and/or a licensed shared band. This is not limited in the present invention.

In this embodiment of the present invention, optionally, the instruction message sent by the first sending module 41 includes band sequence number information, where the band sequence number information is used to indicate a band sequence number corresponding to each band in the second band.

In this embodiment of the present invention, optionally, as shown in FIG. 9, the wireless access device 40 further includes a determining module 44, configured to determine time information used to instruct the terminal device to detect the information transmitted on the second band.

Correspondingly, the instruction message sent by the first sending module 41 further includes the time information determined by the determining module 44.

In this embodiment of the present invention, optionally, the determining module 44 is specifically configured to: determine a candidate timeslot corresponding to a time segment in which the information is sent on the second band; and determine the time information according to the candidate timeslot.

In this embodiment of the present invention, optionally, the time information determined by the determining module 44 includes first duration, where the first duration is duration in which the terminal device detects the information transmitted on the second band.

In this embodiment of the present invention, optionally, the time information determined by the determining module 44 further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of the candidate timeslot.

In this embodiment of the present invention, optionally, a sum of the second duration and the first duration that are determined by the determining module 44 is greater than or equal to the second time interval; or a sum of the second duration and the first duration that are determined by the determining module 44 is greater than or equal to the second time interval and less than or equal to a sum of the second time interval and duration that is corresponding to the candidate timeslot.

It should be understood that the wireless access device 40 in this embodiment of the present invention may correspond to the information transmission method 100 in the embodiment of the present invention, and the foregoing and other operations and/or functions of each module in the wireless access device 40 are intended to separately implement the corresponding process of each method in FIG. 2 and FIG. 3. For brevity, details are not described herein again.

Therefore, the wireless access device in this embodiment of the present invention sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

Figure 10:
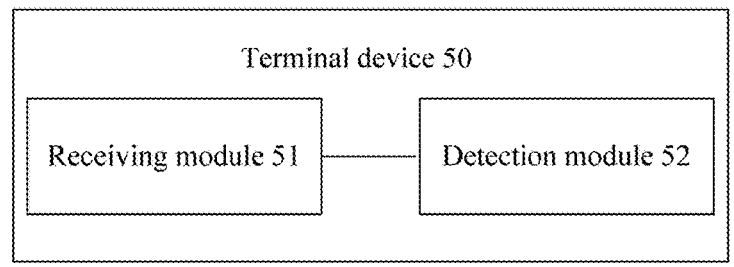
FIG. 10 is a schematic block diagram of a terminal device according to an embodiment of the present invention.

FIG. 10 is a schematic block diagram of a terminal device according to an embodiment of the present invention. As shown in FIG. 10, the terminal device 50 includes: a receiving module 51, configured to receive, on a first band, an instruction message sent by a wireless access device, where the instruction message is used to instruct the terminal device to detect information on a second band; and a detection module 52, configured to detect the information transmitted on the second band according to the instruction message received by the receiving module 51.

Specifically, the receiving module 51 of the terminal device receives, on the first band, the instruction message that is used to instruct the terminal device to detect the information transmitted on the second band and that is sent by the wireless access device. Then, the detection module 52 of the terminal device detects, on the second band according to the instruction message, the information sent by the wireless access device to the terminal device.

Therefore, the terminal device in this embodiment of the present invention receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

In this embodiment of the present invention, optionally, the second band may be an unlicensed band and/or a licensed shared band. This is not limited in the present invention.

Figure 11:
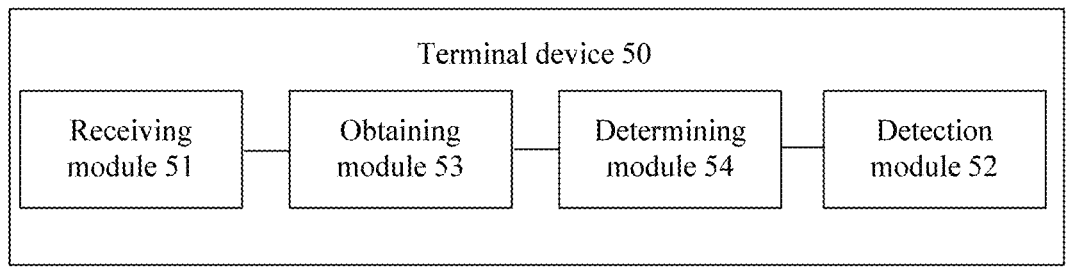
FIG. 11 is another schematic block diagram of a terminal device according to an embodiment of the present invention.

In this embodiment of the present invention, optionally, the instruction message received by the receiving module 51 includes band sequence number information. As shown in FIG. 11, the terminal device 50 further includes: an obtaining module 53, configured to obtain the band sequence information included in the instruction message received by the receiving module 51; and a determining module 54, configured to determine, according to the band sequence number information obtained by the obtaining module 53, the second band used by the wireless access device to send the information transmitted on the second band.

Correspondingly, the detection module 52 is specifically configured to detect, according to the instruction message received by the receiving module 51, the information transmitted on the second band determined by the determining module 54.

In this embodiment of the present invention, optionally, the instruction message received by the receiving module 51 further includes time information used to instruct the terminal device to detect the information transmitted on the second band.

In this embodiment of the present invention, optionally, the time information includes first duration, where the first duration is duration in which the detection module 52 detects the information transmitted on the second band. Correspondingly, the detection module 52 is specifically configured to: when detecting the information transmitted on the second band within the first duration that is after detection of the information transmitted on the second band is started, use a moment at which the information is detected as a start moment at which the wireless access device sends the information transmitted on the second band.

In this embodiment of the present invention, optionally, the time information further includes second duration, the second duration is a first time interval between a moment at which the receiving module 51 receives the instruction message and a moment at which the detection module 52 starts to detect the information transmitted on the second band, and the second duration is less than or equal to a second time interval between the moment at which the receiving module 51 receives the instruction message and a start moment of a candidate timeslot corresponding to a time segment in which the wireless access device sends the information transmitted on the second band. Correspondingly, the detection module 52 is specifically configured to: after the receiving module 51 receives the instruction message and after the second duration expires, start to detect the information transmitted on the second band; and when detecting the information transmitted on the second band within the first duration, use the moment at which the information is detected as the start moment at which the wireless access device sends the information transmitted on the second band.

In this embodiment of the present invention, optionally, a sum of the second duration and the first duration is greater than or equal to the second time interval; or a sum of the second duration and the first duration is greater than or equal to the second time interval and less than or equal to a sum of the second time interval and duration that is corresponding to the candidate timeslot.

Correspondingly, the detection module 52 is specifically configured to: when detecting the information transmitted on the second band within the first duration that is after detection of the information transmitted on the second band is started, use the moment at which the information is detected as the start moment at which the wireless access device sends the information transmitted on the second band; or when not detecting the information transmitted on the second band within the first duration that is after detection of the information transmitted on the second band is started, instruct the terminal device to enter a dormant state on the second band.

In this embodiment of the present invention, optionally, the second band may be an unlicensed band and/or a licensed shared band. This is not limited in the present invention.

It should be understood that the terminal device 50 in this embodiment of the present invention may correspond to the information transmission method 300 in the embodiment of the present invention, and the foregoing and other operations and/or functions of each module in the terminal device 50 are intended to separately implement the corresponding process in FIG. 7. For brevity, details are not described herein again.

Therefore, the terminal device in this embodiment of the present invention receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

Figure 12:
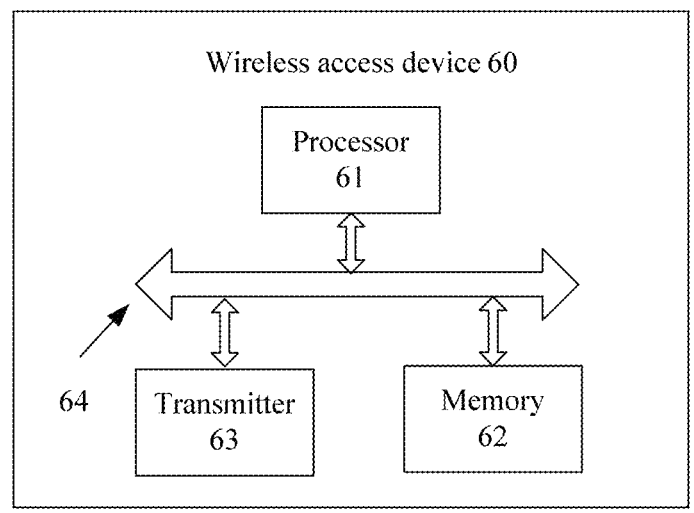
FIG. 12 is a schematic block diagram of a wireless access device according to another embodiment of the present invention.

As shown in FIG. 12, an embodiment of the present invention further provides a wireless access device 60. The wireless access device 60 includes a processor 61, a memory 62, a transmitter 63, and a bus system 64. The processor 61, the memory 62, and the transmitter 63 are connected by using the bus system 64. The memory 62 is configured to store an instruction, and the processor 61 is configured to execute the instruction stored by the memory 62 to control the transmitter 63 to send a signal. The transmitter 63 is configured to send an instruction message to a terminal device on a first band, where the instruction message is used to instruct the terminal device to detect information on a second band. The processor 61 is configured to obtain permission to use a spectrum resource on the second band. The transmitter 63 is further configured to send the information to the terminal device on the second band.

Therefore, the wireless access device in this embodiment of the present invention sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

It should be understood that, in this embodiment of the present invention, the processor 61 may be a central processing unit ("CPU" for short), or the processor 61 may be another universal processor, a digital signal processor (DSP), an application-specific integrated circuit (ASIC), a field programmable gate array (FPGA) or another programmable logic device, a discrete gate or a transistor logic device, a discrete hardware component, or the like. The universal processor may be a microprocessor, or the processor may be any conventional processor or the like.

The memory 62 may include a read-only memory and a random access memory, and provides the instruction and data to the processor 61. A part of the memory 62 may further include a non-volatile random access memory. For example, the memory 62 may further store device-type information.

In addition to a data bus, the bus system 64 may further include a power bus, a control bus, a status signal bus, and the like. However, for clear description, all buses are marked as the bus system 64 in the figure.

During an implementation process, each step in the foregoing methods may be completed by hardware, that is, an integrated logical circuit in the processor 61, or by an instruction in a software form. The steps of the methods disclosed with reference to the embodiments of the present invention may be directly performed by a hardware processor, or may be performed by a combination of hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 62, and the processor 61 reads information in the memory 62 and completes the steps in the foregoing methods by using the hardware of the processor. To avoid repetition, details are not described herein again.

Optionally, as an embodiment, the second band is an unlicensed band and/or a licensed shared band.

Optionally, as an embodiment, the instruction message sent by the transmitter 63 includes band sequence number information, where the band sequence number information is used to indicate a band sequence number corresponding to each band in the second band.

Optionally, as an embodiment, the processor 61 is configured to determine time information used to instruct the terminal device to detect the information transmitted on the second band. Correspondingly, the instruction message sent by the transmitter 63 further includes the time information determined by the processor 61.

Optionally, as an embodiment, the processor 61 is specifically configured to: determine a candidate timeslot corresponding to a time segment in which the information is sent on the second band; and determine the time information according to the candidate timeslot.

Optionally, as an embodiment, the time information determined by the processor 61 includes first duration, where the first duration is duration in which the terminal device detects the information transmitted on the second band.

Optionally, as an embodiment, the time information determined by the processor 61 further includes second duration, the second duration is a first time interval between a moment at which the terminal device receives the instruction message and a moment at which the terminal device starts to detect the information transmitted on the second band, and the second duration is less than or equal to a second time interval between the moment at which the terminal device receives the instruction message and a start moment of the candidate timeslot.

Optionally, as an embodiment, a sum of the second duration and the first duration is greater than or equal to the second time interval; or a sum of the second duration and the first duration is greater than or equal to the second time interval and less than or equal to a sum of the second time interval and duration that is corresponding to the candidate timeslot.

It should be understood that the wireless access device 60 in this embodiment of the present invention may correspond to the wireless access device 40 in the embodiment of the present invention and may correspond to a corresponding subject that executes the methods according to the embodiments of the present invention. In addition, the foregoing and other operations and/or functions of each module in the wireless access device 60 are intended to separately implement the corresponding process of each method in FIG. 2 and FIG. 3. For brevity, details are not described herein again.

Therefore, the wireless access device in this embodiment of the present invention sends an instruction message to a terminal device, to instruct the terminal device to detect information on a second band, so that the terminal device can determine a start moment at which the wireless access device transmits the information transmitted on the second band. In this way, the terminal device may be in a dormant state when no information is transmitted on the second band, and receive information when the information is transmitted on the second band. Therefore, power consumption overheads of the terminal device can be reduced.

Figure 13:
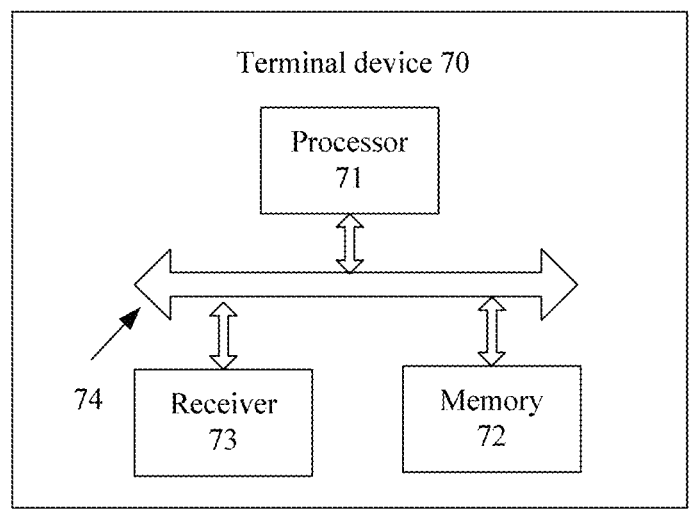
FIG. 13 is a schematic block diagram of a terminal device according to another embodiment of the present invention.

As shown in FIG. 13, an embodiment of the present invention further provides a terminal device 70. The terminal device 70 includes a processor 71, a memory 72, a receiver 73, and a bus system 74. The processor 71, the memory 72, and the receiver 73 are connected by using the bus system 74. The memory 72 is configured to store an instruction, and the processor 71 is configured to execute the instruction stored in the memory 72, to control the receiver 73 to receive a signal. The receiver 73 is configured to receive, on a first band, an instruction message sent by a wireless access device, where the instruction message is used to instruct the terminal device to detect information on a second band. The processor 71 is configured to detect the information transmitted on the second band according to the instruction message received by the receiver 73.

Therefore, the terminal device in this embodiment of the present invention receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

It should be understood that, in this embodiment of the present invention, the processor 71 may be a central processing unit ("CPU" for short), or the processor 71 may be another universal processor, a digital signal processor (DSP), an application-specific integrated circuit (ASIC), a field programmable gate array (FPGA) or another programmable logic device, a discrete gate or a transistor logic device, a discrete hardware component, or the like. The universal processor may be a microprocessor, or the processor may be any conventional processor or the like.

The memory 72 may include a read-only memory and a random access memory, and provides the instruction and data to the processor 71. A part of the memory 72 may further include a non-volatile random access memory. For example, the memory 72 may further store device-type information.

In addition to a data bus, the bus system 74 may further include a power bus, a control bus, a status signal bus, and the like. However, for clear description, all buses are marked as the bus system 74 in the figure.

During an implementation process, each step in the foregoing methods may be completed by hardware, that is, an integrated logical circuit in the processor 71, or by an instruction in a software form. The steps of the methods disclosed with reference to the embodiments of the present invention may be directly performed by a hardware processor, or may be performed by a combination of hardware in the processor and a software module. The software module may be located in a mature storage medium in the art, such as a random access memory, a flash memory, a read-only memory, a programmable read-only memory or an electrically erasable programmable memory, or a register. The storage medium is located in the memory 72, and the processor 71 reads information in the memory 72 and completes, in combination with the hardware of the processor, the steps of the foregoing methods. To avoid repetition, details are not described herein again.

Optionally, as an embodiment, the second band is an unlicensed band and/or a licensed shared band.

Optionally, as an embodiment, the instruction message received by the receiver 73 includes band sequence number information. Correspondingly, the processor 71 is configured to obtain the band sequence number information included in the instruction message that is received by the receiver 73, determine, according to the band sequence number information, the second band used by the wireless access device to send the information, and detect the information transmitted on the second band according to the instruction message.

Optionally, as an embodiment, the instruction message received by the receiver 73 further includes time information used to instruct the terminal device to detect the information transmitted on the second band.

Optionally, as an embodiment, the time information includes first duration, where the first duration is duration in which the processor 71 detects the information transmitted on the second band.

Correspondingly, the processor 71 is specifically configured to: when detecting the information transmitted on the second band within the first duration that is after detection of the information transmitted on the second band is started, use a moment at which the information is detected as a start moment at which the wireless access device sends the information transmitted on the second band.

Optionally, as an embodiment, the time information further includes second duration, the second duration is a first time interval between a moment at which the receiver 73 receives the instruction message and a moment at which the processor 71 starts to detect the information transmitted on the second band, and the second duration is less than or equal to a second time interval between the moment at which the receiver 73 receives the instruction message and a start moment of a candidate timeslot corresponding to a time segment in which the wireless access device sends the information transmitted on the second band.

Correspondingly, the processor 73 is specifically configured to: after the receiver 73 receives the instruction message and after the first duration expires, start to detect the information transmitted on the second band; and when detecting the information transmitted on the second band within the first duration, use the moment at which the information is detected as the start moment at which the wireless access device sends the information transmitted on the second band.

Optionally, as an embodiment, a sum of the second duration and the first duration is greater than or equal to the second time interval; or a sum of the second duration and the first duration is greater than or equal to the second time interval and less than or equal to a sum of the second time interval and duration that is corresponding to the candidate timeslot.

Correspondingly, the processor 73 is specifically configured to: when detecting the information transmitted on the second band within the first duration that is after detection of the information transmitted on the second band is started, use the moment at which the information is detected as the start moment at which the wireless access device sends the information transmitted on the second band; or when not detecting the information transmitted on the second band within the first duration that is after detection of the information transmitted on the second band is started, instruct the terminal device to enter a dormant state on the second band.

It should be understood that the terminal device 70 in this embodiment of the present invention may correspond to the terminal device 50 in the embodiment of the present invention, and may correspond to a corresponding subject that executes the methods according to the embodiments of the present invention. In addition, the foregoing and other operations and/or functions of each module in the terminal device 70 are intended to separately implement the corresponding process in FIG. 7. For brevity, details are not described herein again.

Therefore, the terminal device in this embodiment of the present invention receives an instruction message sent by a wireless access device and detects information on a second band according to the instruction message. The terminal device may be in a dormant state when no information is transmitted on the second band, and when information is transmitted on the second band, determine a start moment at which the wireless access device transmits the information transmitted on the second band, and receive the information. In this way, power consumption overheads can be reduced.

It should be understood that "one embodiment" or "an embodiment" mentioned throughout the specification indicates that a particular characteristic, structure or property that is related to the embodiment is included in at least one embodiment of the present invention. Therefore, "in one embodiment" or "in an embodiment" that appears throughput the entire specification does not necessarily mean a same embodiment. Moreover, the particular characteristic, structure, or property may be combined in one or more embodiments in any proper manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/"

in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory ("ROM" for short), a random access memory ("RAM" for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    determining, by an access device, time information used to instruct a terminal device to detect information that will subsequently be sent to the terminal device by the access device on a second band, wherein the time information comprises a first duration and a second duration, the first duration is a duration in which the terminal device is instructed to attempt to detect the information sent by the access device on the second band, the second duration is a duration between a moment at which the terminal device receives an instruction message comprising the time information and a moment at which the terminal device starts to detect the information sent on the second band, and the second duration is less than a time interval between the moment at which the terminal device receives the instruction message and a start moment of a candidate timeslot corresponding to a time segment in which the access device sends the information sent on the second band;
    sending, by an access device, the instruction message to the terminal device on a first band, wherein the instruction message instructs the terminal device to attempt to detect the information that will subsequently be sent by the access device on the second band, and wherein the instruction message comprises the time information;
    obtaining, by the access device, permission to use a spectrum resource on the second band; and
    sending, by the access device, the information to the terminal device on the second band.

2. The method according to claim 1, wherein the second band comprises an unlicensed band or a licensed shared band.

3. The method according to claim 1, wherein the instruction message further comprises band sequence number information, and the band sequence number information indicates a band sequence number corresponding to each band in the second band.

4. The method according to claim 1, wherein determining the time information used to instruct the terminal device to attempt to detect the information that will subsequently be sent on the second band comprises:
    determining the candidate timeslot corresponding to the time segment in which the information will subsequently be sent on the second band; and
    determining the time information according to the candidate timeslot.

5. A method, comprising:
    receiving, by a terminal device on a first band, an instruction message sent by a wireless access device, wherein the instruction message instructs a terminal device to detect information on a second band, wherein the instruction message comprises time information used to instruct the terminal device to detect the information that will subsequently be sent to the terminal device by the wireless access device on the second band, wherein the time information comprises a first duration, and the first duration is a duration in which the terminal device is instructed to attempt to detect the information sent by the wireless access device on the second band;

attempting to detect, by the terminal device, the information sent by the wireless access device on the second band according to the instruction message; and when the terminal device does not receive, within the first duration, the information sent by the wireless access device on the second band, stopping, by the terminal device, attempting to detect the information transmitted on the second band, and entering, by the terminal device, a dormant state.

6. The method according to claim 5, wherein the instruction message further comprises band sequence number information; and wherein attempting to detect the information sent on the second band according to the instruction message comprises:
obtaining the band sequence number information comprised in the instruction message;
determining, according to the band sequence number information, the second band used by the wireless access device to send the information; and
attempting to detect the information sent by the wireless access device on the second band according to the instruction message.

7. The method according to claim 5, further comprising:
when the information sent on the second band is detected within the first duration that is after detection of the information sent on the second band is started, using a moment at which the information is detected as a start moment at which the wireless access device sends the information sent on the second band.

8. The method according to claim 7, wherein the time information further comprises a second duration, the second duration is a first time interval between a moment at which the terminal device receives the instruction message and a moment at which the terminal device starts to attempt to detect the information sent on the second band, and the second duration is less than or equal to a second time interval between the moment at which the terminal device receives the instruction message and a start moment of a candidate timeslot corresponding to a time segment in which the wireless access device sends the information sent on the second band; and wherein detecting the information sent on the second band according to the instruction message comprises:
starting detecting the information sent on the second band after the instruction message is received and after the second duration expires; and
when the information sent on the second band is detected within the first duration, using the moment at which the information is detected as the start moment at which the wireless access device sends the information sent on the second band.

9. An access device, comprising:
a processor, configured to determine time information used to instruct a terminal device to detect information that will subsequently be sent to the terminal device by the access device on a second band, wherein the time information comprises a first duration and a second duration, the first duration is a duration in which the terminal device is instructed to attempt to detect the information sent by the access device on the second band, the second duration is a duration between a moment at which the terminal device receives an instruction message comprising the time information and a moment at which the terminal device starts to attempt to detect the information sent on the second band, and the second duration is less than a time interval between the moment at which the terminal device receives the instruction message and a start moment of a candidate timeslot corresponding to a time segment in which the access device sends the information sent on the second band; and a transmitter, configured to send an instruction message to the terminal device on a first band, wherein the instruction message instructs the terminal device to detect the information on the second band, and wherein the instruction message comprises the time information;

wherein the processor is further configured to obtain permission to use a spectrum resource on the second band; and wherein the transmitter is further configured to send the information to the terminal device on the second band.

10. The access device according to claim 9, wherein the instruction message sent by the transmitter comprises band sequence number information, and the band sequence number information indicates a band sequence number corresponding to each band in the second band.

11. The access device according to claim 9, wherein the processor is configured to:
determine the candidate timeslot corresponding to the time segment in which the information is sent on the second band; and
determine the time information according to the candidate timeslot.

12. A terminal device, comprising:
a receiver, configured to receive, on a first band, an instruction message sent by a wireless access device, wherein the instruction message instructs the terminal device to attempt to detect information on a second band, wherein the instruction message comprises time information used to instruct the terminal device to detect the information that will subsequently be sent by the wireless access device on the second band, wherein the time information comprises a first duration, and the first duration is a duration in which the terminal device is instructed to attempt to detect the information sent by the wireless access device on the second band; and a processor, configured to:
attempt to detect the information sent on the second band according to the instruction message received by the receiver; and
when the terminal device does not receive, within the first duration, the information sent by the wireless access device on the second band, stopping, by the terminal device, attempting to detect the information transmitted on the second band, and entering, by the terminal device, a dormant state.

13. The terminal device according to claim 12, wherein the instruction message received by the receiver comprises band sequence number information; and wherein the processor is further configured to:
obtain the band sequence number information comprised in the instruction message received by the receiver;
determine, according to the band sequence number information, the second band used by the wireless access device to send the information; and attempt to detect, according to the instruction message, the information sent on the second band.

14. The terminal device according to claim 12, wherein the processor is further configured to, when detecting the information sent on the second band within the first duration that is after detection of the information sent on the second band is started, use a moment at which the information is detected as a start moment at which the wireless access device sends the information sent on the second band.

15. The terminal device according to claim 14, wherein the time information further comprises a second duration, the second duration is a first time interval between a moment at which the receiver receives the instruction message and a moment at which the processor starts to detect the information sent on the second band, and the second duration is less than or equal to a second time interval between the moment at which the receiver receives the instruction message and a start moment of a candidate timeslot corresponding to a time segment in which the wireless access device sends the information sent on the second band; and wherein the processor is configured to:
after the receiver receives the instruction message and after the second duration expires, start to detect the information sent on the second band; and
when detecting the information sent on the second band within the first duration, use the moment at which the information is detected as the start moment at which the wireless access device sends the information sent on the second band.

16. The terminal device according to claim 15, wherein a sum of the second duration and the first duration is greater than or equal to the second time interval, or a sum of the second duration and the first duration is greater than or equal to the second time interval and less than or equal to a sum of the second time interval and a duration that corresponds to the candidate timeslot; and wherein the processor is configured to:
when detecting the information sent on the second band within the first duration that is after detection of the information sent on the second band is started, use the moment at which the information is detected as the start moment at which the wireless access device sends the information sent on the second band; or
when not detecting the information sent on the second band within the first duration that is after detection of the information sent on the second band is started, instruct the terminal device to enter a dormant state on the second band.

* * * * *